J. W. Andrews,
Making Cheese.
No. 88,830. Fig. 1.  Patented Apr. 13, 1869.
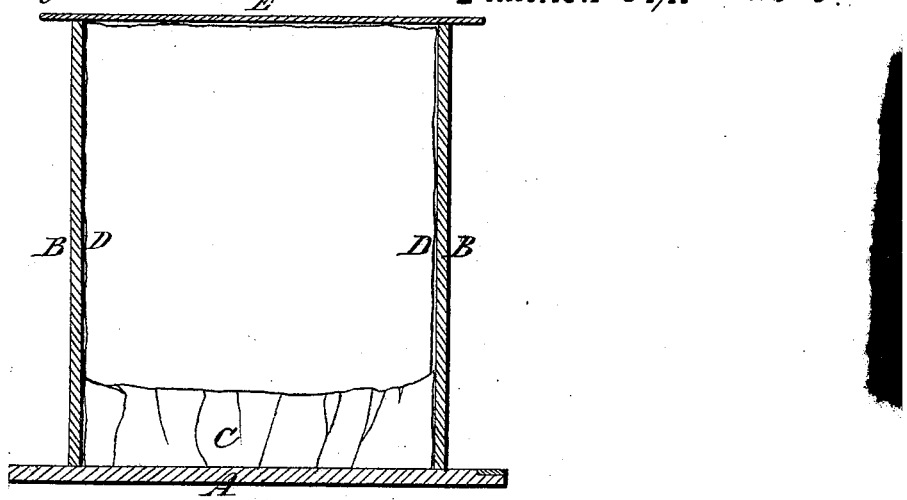
Fig. 2.
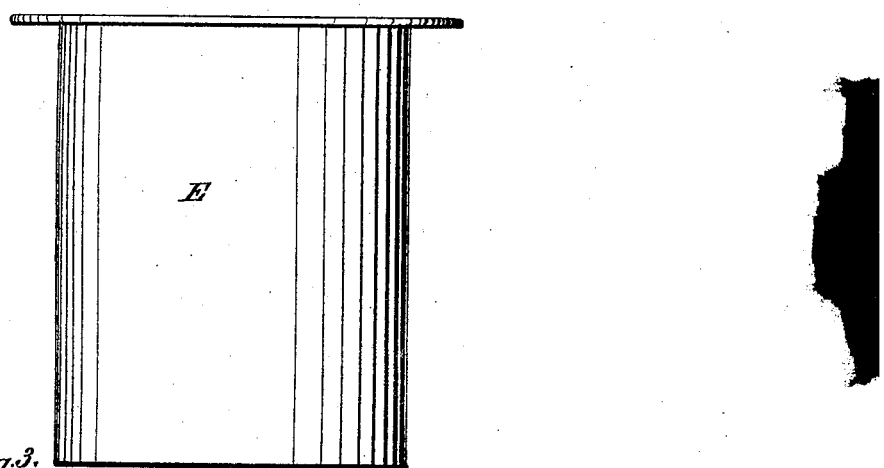
Fig. 3.
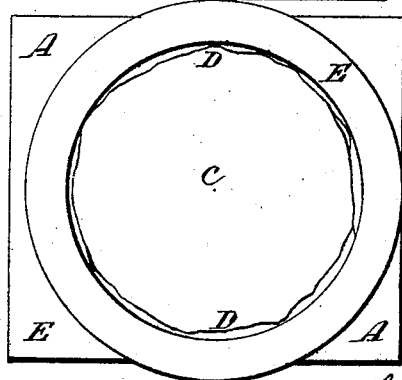
Witnesses.
Cornelius Cox
Leopold Eneri
Inventor.
J. W. Andrews
N. J. Ogden
per Alexander & Mason
Attys.

UNITED STATES PATENT OFFICE.

J. W. ANDREWS AND N. J. OGDEN, OF DRYDEN, NEW YORK.

IMPROVEMENT IN THE MANUFACTURE OF CHEESE.

Specification forming part of Letters Patent No. 88,830, dated April 13, 1869.

*To all whom it may concern:*

Be it known that we, J. W. ANDREWS and N. J. OGDEN, of Dryden, in the county of Tompkins and in the State of New York, have invented certain new and useful Improvements in Manufacture of Cheese; and do hereby declare that the following is a full, clear, and exact description thereof, reference being had to the accompanying drawings, and to the letters of reference marked thereon.

The nature of our invention consists in a tin hoop, to be used inside of the ordinary cheese-hoop, and in the manner of applying the bandages while the cheese is being manufactured.

In order to enable others skilled in the art to which our invention appertains to make and use the same, we will now proceed to describe its construction and operation, referring to the annexed drawings, which form a part of this specification, and in which—

Figure 1 is a side view in section; Fig. 2, a side view of the tin hoop; and Fig. 3, a plan view.

A represents the press-board, and B the wooden hoop ordinarily used in dairies and cheese-factories. C is a square cloth, called a press-cloth, and is such as is in ordinary use. The bandage D also is such as all use.

It is the custom in cheese-factories to spread the press-cloth upon the press-board, set the hoop on the same, fill with curd, and apply pressure.

The curd invariably oozes out under the hoop to such an extent that there is considerable loss, and what is not lost has to be re-worked at considerable disadvantage.

To obviate this difficulty, we have devised a hoop, E, made of tin or other suitable material, which at its upper end is provided with a circular flange extending outward, as shown in Fig. 2. This tin hoop is used as follows: The bandage D is slipped over the tin hoop E, leaving the lower edge to project a little beyond the hoop. The press-cloth C is then spread over the wooden hoop B, and the tin hoop E, with its bandage, is then thrust into the wooden one. The projecting end of the bandage D is adjusted by hand, so as to be turned in, that the curd may rest on the same. The curd is then filled in and the hoop E withdrawn, leaving the bandage nicely in place, the press-cloth C and bandage D both forming a neat lining to the hoop B. The cheese being pressed into the bandage, fills the meshes of the cloth, and makes a nicer outer surface or rind than by the old method, while the saving of time and trouble is very great.

Having thus fully described our invention, what we claim as new, and desire to secure by Letters Patent, is—

The combination of the wood hoop B, circumferential-flanged metal hoop E, bandage D, and press-cloth C, all as and for the purposes set forth.

In testimony that we claim the foregoing we have hereunto set our hands and seals this 4th day of September, 1868.

J. W. ANDREWS. [L. S.]
N. J. OGDEN. [L. S.]

Witnesses:
M. E. PINCKNEY,
J. G. KIMBERLIN.